United States Patent [19]

Yokoyama

[11] Patent Number: 4,742,572
[45] Date of Patent: May 3, 1988

[54] OPTICAL FIBER DATA LINK SYSTEM

[75] Inventor: Makoto Yokoyama, Setoshi, Japan

[73] Assignee: Kawamura Electric Industry Co., Ltd., Aichi, Japan

[21] Appl. No.: 861,098

[22] Filed: May 8, 1986

[30] Foreign Application Priority Data

May 17, 1985 [JP] Japan .................. 60-106663

[51] Int. Cl.⁴ .................. H04B 9/00; G05B 23/02; H04J 3/16
[52] U.S. Cl. .................. 455/607; 455/601; 370/89; 340/825.07
[58] Field of Search ............ 455/607, 608, 601, 612; 370/89, 90, 86; 340/825.07

[56] References Cited

U.S. PATENT DOCUMENTS

| | | | |
|---|---|---|---|
| 3,577,187 | 4/1971 | Benson | 340/825.07 |
| 4,383,315 | 5/1983 | Torng | 370/89 |
| 4,486,750 | 12/1984 | Aoki | 370/91 |
| 4,554,673 | 11/1985 | Stevens | 455/608 |
| 4,602,366 | 7/1986 | Takumi | 370/89 |
| 4,654,890 | 3/1987 | Hasegawa et al. | 455/607 |

FOREIGN PATENT DOCUMENTS 123507 10/1984 European Pat. Off. ............ 455/612

Primary Examiner—Robert L. Griffin
Assistant Examiner—Andrew J. Telesz, Jr.
Attorney, Agent, or Firm—Lahive & Cockfield

[57] ABSTRACT

An optical fiber data link system comprising a controller and one or more stations, all of which are connected to one another by a series of optical fibers providing a single loop as a whole. At least one data input module and/or one data output module is connected to each station. The controller includes a light receiving element, a serial-parallel converter, an circuit for generating an address/data indicating signal, an address setting circuit, a parallel-serial converter and a luminous element. Each station includes a light receiving element, a serial-parallel converter, an address/data distinguish circuit, a parallel-serial converter and a luminous element. Each data input module includes an address decoder, a comparison circuit, a switch circuit, a data latch circuit and one or more input terminals. Each data output module includes an address decoder, a comparison circuit, a switch circuit, a data latch circuit and one or more output terminals.

27 Claims, 6 Drawing Sheets

OPTICAL FIBER DATA LINK SYSTEM

FIELD OF THE INVENTION

This invention relates to a system for receiving data from a measurement section or sensor section and transmitting them to an output section.

BACKGROUND OF THE INVENTION

Heretofore one input section has been connected to one output setion by one transmission line for transmitting data from the former to the latter. Where a plurality of input and output sections are involved, therefore, it has been customary to associate or connect the respective input sections with the corresponding output sections by different transmission lines. A control section has been provided to input data at fixed times and output them at fixed times. In order to control a plurality of data input and output sections by the control section, it has been customary to connect the corresponding input and output sections by a plurality of transmission lines arranged in parallel with one another (FIG. 8). Where such an arrangement is made, a relatively high level of control is required for proper selection of I/O terminals or proper transmission of data. In general, microcomputers are used for the high level of control.

However, where microcomputers are used, it is also necessary to provide interfaces suitable for the microcomputers. Where such interfaces are used if the microcomputers are modified or replaced with others so as to increase the data transmission capability of the entire data link system, the interfaces must be accordingly modified or replaced. Also, in such a case, a new software must also be developed. Furthermore, if, for example, the data transmission system with the microcomputers is used for an air conditioning system in a building, the need to connect the microcomputers to each room may result in relatively longer transmission lines.

SUMMARY OF THE INVENTION

Accordingly, it is an object of the invention to provide a data link system which employs shorter data transmission lines and in which a control section can be modified, without involving any necessity of modification of input and output terminals, so as to improve the data transmission capability of the entire system.

Another object of the invention is to provide a data link system of the character described which is highly resistant to noise and in which malfunctions are minimized.

Other objects of the invention will become apparent upon consideration of a detailed description of the invention which will follow.

DESCRIPTION OF THE FUNDAMENTAL CONSTRUCTION

Figure 1:
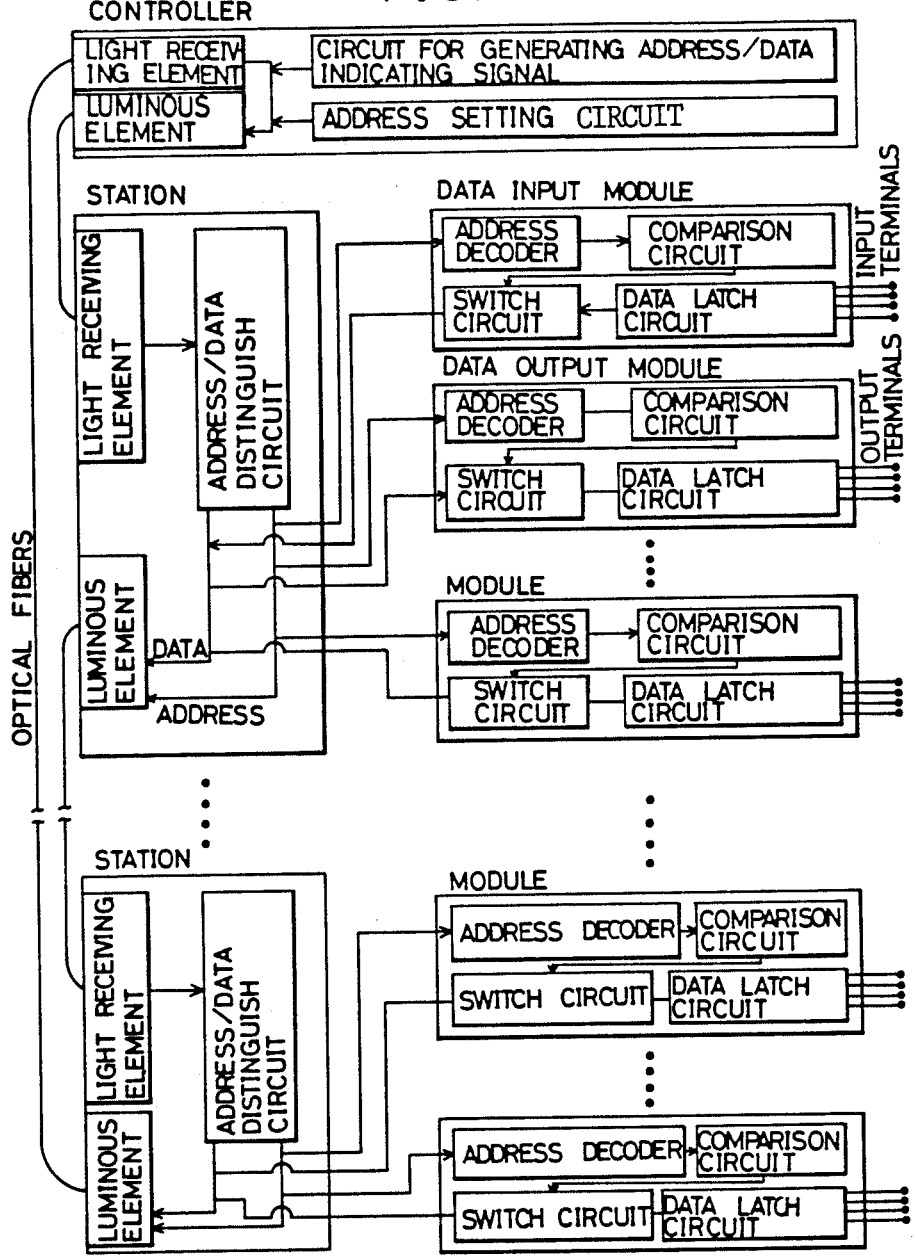
FIG. 1 shows the fundamental construction of an optical fiber data system according to the invention.

Referring to FIG. 1, description will now be made of the fundamental construction of an optical fiber data link system according to the invention. The data link system includes one controller and one or more stations, all of which are connected to one another by a series of optical fibers substantially making a single loop, as a whole, while linking them together. A desired number of data input modules and/or data output modules may be connected to each station; that is, one or more data input modules may be connected thereto without or together with one or more data output modules, or vice versa. Each module is given an address of its own. Such an address may be assigned thereto by any suitable method. For example, the module may be provided with dip switches to set an address therefor, or ROM may be built-in in the module for the same purpose.

The controller includes at least a light receiving element, a circuit for generating an address/data indicating signal, an address setting circuit, and a luminous element. All stations are the same as each other or one another in construction, each including at least a light receiving element, an address/data distinguish circuit and a luminous element. Each data input module includes an address decoder, a comparison circuit, a switch circuit, a data latch circuit, and one or more input terminals. The data latch circuit of the data input module is adapted to latch a binary digit representing a data as to each input terminal of the data input module, e.g., either H (high) or L (low) or either closing or opening of a circuit thereby. Each data output module includes an address decoder, a comparison circuit, a switch circuit, a data latch circuit, and one or more output terminals. Each output terminal of the data output module is adapted to provide an output representing a certain condition of the output terminal, e.g., either H (high) or L (low) or either closing or opening of a circuit thereby, in accordance with the data in the data latch circuit of the data output module.

While the same address must not be assigned to more than one data input module, more than one data output module may be given the same address. Two or more data output modules with the same address would perform the same function.

Addresses may be assigned to the modules without regard to the order of connection of the modules to the stations; that is, smaller numbers need not be given to the upper modules in FIG. 1. Also, addresses of the modules may or may not be serial numbers. In principle, one data input module and one data input module are given the same addresses.

The present optical fiber data link system has the above-mentioned fundamental construction. For particular applications, the controller may be further provided with a circuit for generating signals to specify either input or output mode or a circuit for memorizing addresses and data.

Figure 2:
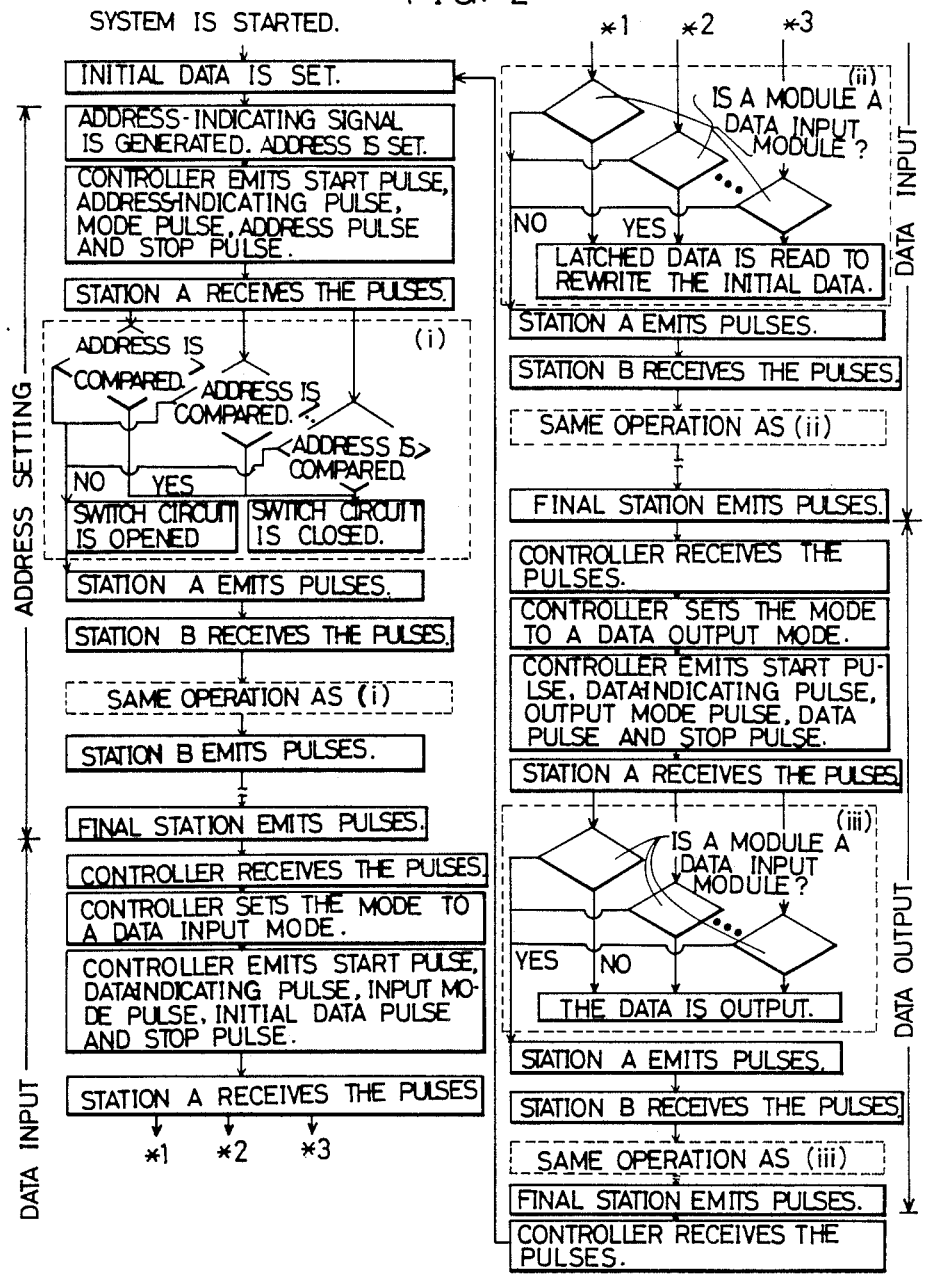
FIGS. 2 and 3 show two different types of fundamental modes of operation of the data link system of FIG. 1, respectively.
Figure 3:
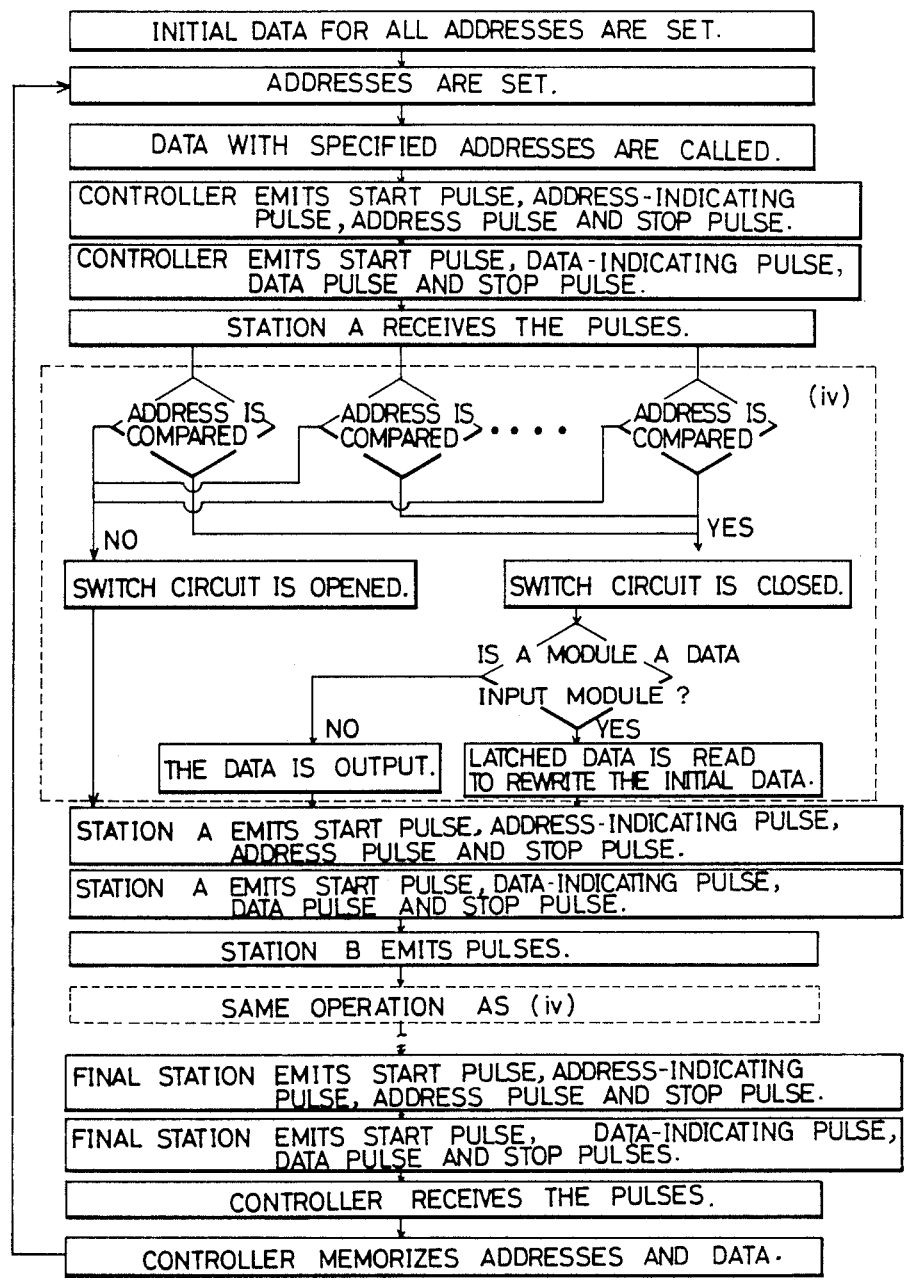

Referring to FIGS. 2 and 3, description will next be made of two different kinds of fundamental modes of operation of the present data link system. First, a mode of operation as shown in FIG. 2 will be described. In this mode, address setting, data input and data output are performed in the order mentioned, and the whole series of these operations is repeated a number of times. For the operation of FIG. 2, the controller is provided with a circuit for generating a signal to specify either input or output mode.

When the system has been started, the following operations are made in the controller: An initial data is set. The initial data has no significance in itself, so it may be any desired one, such as 0 (zero). Then, an address-/data indicating signal is generated. Immediately after the start of the system, this signal is set in an "on" condition so that it will indicate an address. Thus the system is set in an address/operative condition. Next, an address is set to specify particular data input and output modules. An address may be input from outside the system. For example, the controller may be provided with dip switches with which to set an address, or a microcomputer may be used for the same purpose. Or the controller may be provided with a built-in address counter, and values of addresses may be added together in sequence so as to specify modules one after another.

Figure 4:
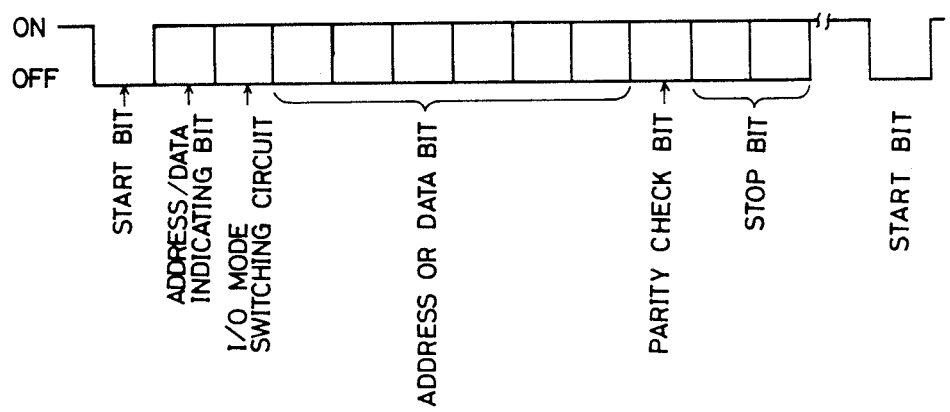
FIG. 4 shows one example of a pulse block used for serial transmission of data by the data link system of FIG. 1.

When the system has been set up as described above, the controller produces optical pulse signals and sends them to a first station A. As clearly shown in FIG. 1, since the adjacent ones of the major components of the system (i.e., the controller and the station or stations) as well as the last major component and the first one are connected to each other by a single optical fiber, the signals are sent to one major component to another in a serial manner. Also the signals are sent out in a binary format, i.e, in either go-on or go-off condition. The produced signals are a start pulse (e.g., 1-bit "off" pulse), the address-indicating pulse, a mode pulse, an address pulse and a stop pulse (e.g., 2-bit "on" pulse), and are sent to the station in the order mentioned. These pulses form a pulse block or train. When the system is in an address-operative condition, the mode pulse has no significance for the operation, so it may be an input or output mode pulse. The address pulse consists of one or more bits; the more bits the address pulse has, more input and output modules can be connected to the stations. If desired, a parity check bit may also be included in the pulse block, as shown in FIG. 4 (which illustrates an example of a pulse block which may be employed for serial transmission of the signals). In the example of FIG. 4, six bits are used for an address pulse so that input modules numbering $2^6$ may be connected to the stations.

The pulse signals are received by the light receiving element in the station A, where they are converted into electric parallel signals. The signals are applied to the address/data distinguish circuit which determines, by the address-indicating pulse, that the address block has been received by the station. Immediately after the system has been started, since the system is in the address-operative condition, the address represented by the address block is sent to the address decoders of all input and output modules connected to the station A. Then, each module determines whether the received address is the same as its address, and if so, closes the switch circuit thereof, or else opens the switch circuit. Thereafter, the station A provides a next station B with the same optical pulse train as received from the controller. In the station B, the same operation as that in the previous station A is performed, including the determination of each module (connected to the station B) of whether the address received from the station B is the same as its address, followed by closing or opening the switch circuit. Then, if a further station is provided, the station B provides a next station with the same pulse train as received by the station B. Thus, the same operations are performed throughout all stations, and finally the pulse train is returned to the light receiving element in the controller.

During the foregoing stage, the switch circuit of one data input module with the specified address as well as the switch circuits of one or more data output modules has been closed, while those of all other modules have been opened. Thus, the address setting stage has been completed.

When the address-indicating pulse (of the pulse train) has returned to the controller, the controller changes that pulse into a data-indicating pulse (by setting that pulse in an "off" condition), and, at the same time, sets the system to an input mode. Then, the controller emits a pulse train which may comprise, for example, optical pulse signals as shown in FIG. 4. That is, a start bit pulse, the data-indicating bit pulse, an input mode pulse, a data pulse (having the initial data), a parity check pulse, and a stop bit pulse may be sent to the station A in the order mentioned. In the station A this pulse train is converted into parallel electric signals, and the address/data distinguish circuit determines, by the data-indicating pulse, that the data block has been received by the station. Since the system has been set to the input mode, a data is provided into the station A from the data latch circuit of the data input module having its switch closed in the previous stage. Thus a new data is written in the data pulse to replace the initial data. If such a data input module is not connected to the station A, the initial data remains unchanged. Thereafter, the station A emits the same pulse train as received from the controller except that the data pulse may now represents a new or rewritten data. The pulse train is sent to the light receiving element of the station B.

The same operation as in the station A is performed in the station B, as well as in a subsequent station or stations if they are provided. Finally the pulse train is returned to the controller.

During the foregoing stage, the initial data has been replaced with a new data from the data latch circuit of the data input module addressed in the first stage.

When the input mode pulse (of the pulse train) has returned to the controller, the system is set to an output mode. Then, the controller emits the same pulse train as received from the last station except that the mode pulse is now the output mode pulse and that the data pulse now represents the rewritten data. By receiving the output mode pulse, each station gives data to the data latch circuits of all output modules connected thereto, and only those data output modules whose switch circuits are closed at this point of time have its data rewritten so that the conditions of their output terminals are changed. Finally the pulse train is returned to the controller.

Upon receiving the output mode pulse, the controller is brought into the same condition as immediately after the system has been started. Then, the addresses of the modules into or from which to input or output data are specified in the same manner as described above, and three steps of address setting, data input and data output are performed again.

Thus, data is input from a desired data input module and transmitted to the output terminals of one or more data output modules having the same address as the data input module.

Referring to FIG. 3, description will be made of another kind of fundamental mode of operation of the present data link system. Unlike the mode of operation of FIG. 2, that of FIG. 3 does not require any additional means to be provided for the fundamental construction of the system as shown in FIG. 1. However, if no additional means is provided, the mode of operation of FIG. 3 requires any data input module to be connected to the light receiving element of the controller in a position at the optical fiber closer to that element than the data output module or modules having the same address as the data input module.

In the mode of operation of FIG. 3, an initial data is set immediately after the system has been started. The initial data may be any desired one. Then, an address is set. The method of setting and purpose of the address are the same as in the case of FIG. 2. After the system has thus been set up, the controller emits an addressing signal block (optical pulse train) comprising a start pulse, an address-indicating pulse, an address pulse and a stop pulse. This pulse train does not contain any I/O mode pulse. This pulse train is followed by a data signal block (optical pulse train) comprising a start pulse, a data-indicating pulse, a data pulse and a stop pulse. Thereafter, these two kinds of signal blocks are alternately emitted. In the station A, the addressing signal block as well as the data signal block is converted into parallel electric signals, and these signals are sent, in a parallel manner, to all data input and output modules connected to the station A. Then, each module determines whether it has been addressed or not, and if addressed, closes its switch circuit, or else opens it. An addressed data input module rewrites the data as that in its latch circuit reads, and the addressed data output module or modules (having the same address as the addressed input module) latch the data sent to them, thus changing the contents of the output therefrom. In all stations, the same operations are made.

In case any data input module is connected to the light receiving element of the controller in a position at the optical fiber closer to that element than the data output module or modules having the same address as the data input module, it is certain that the data output module is first addressed, followed by the data output module or modules, so as to effect the proper data transmission.

In the mode of operation of FIG. 3, the controller is thus allowed to send alternate addressing blocks and data blocks without cease, thereby shortening the data transmission cycle. If a data input module is connected to the light receiving element of the controller in a position at the optical fiber further away from that element than the data output module or modules having the same address as the data input module, it is necessary to provide the controller with a circuit for memorizing addresses and data and to adapt the controller to send data blocks in accordance with the stored information in the memory circuit. With such an arrangement, there will be no problem if the data output module or modules are addressed earlier than the data input module, provided that the correct data is stored in the memory circuit immediately after the system has been started.

DESCRIPTION OF THE PREFERRED EMBODIMENT

Figure 5:
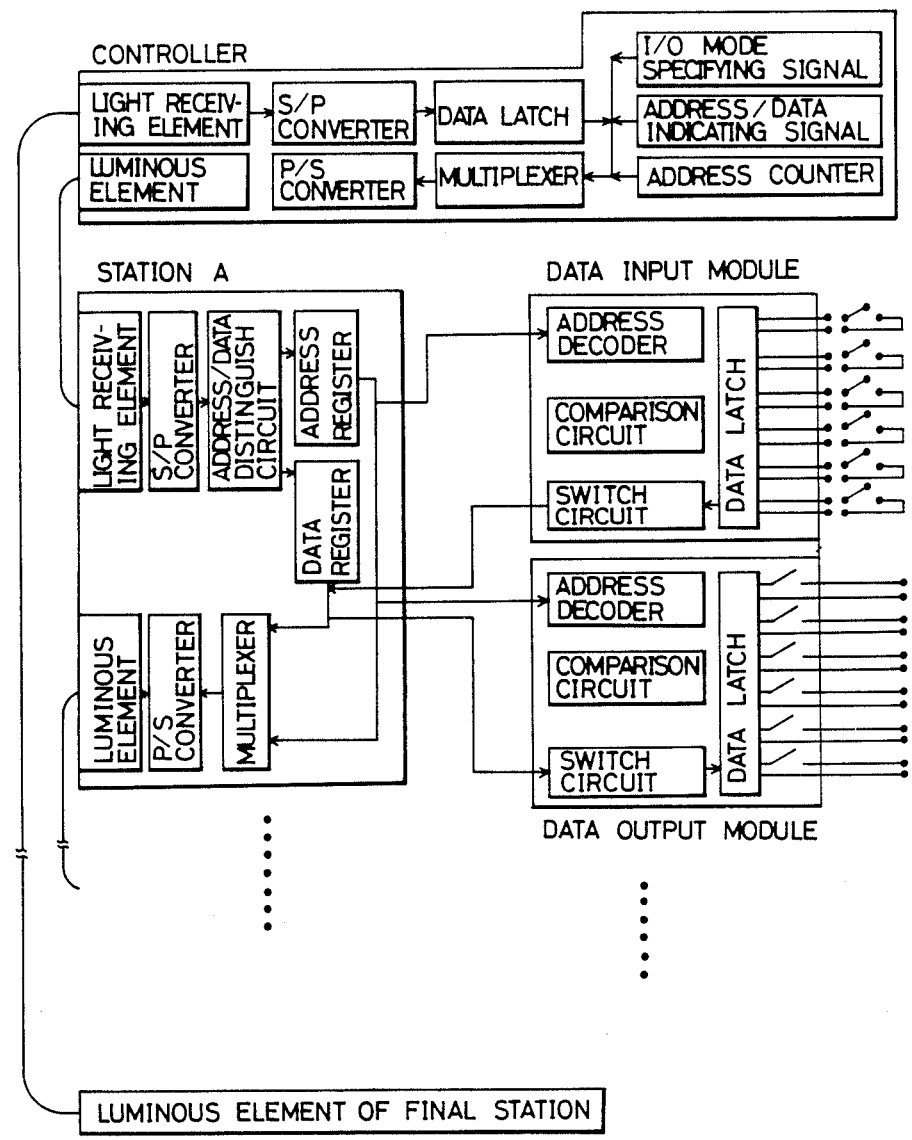
FIG. 5 shows an optical fiber data link system according to one preferred embodiment of the invention.

Referring now to FIG. 5, description will now be made of one preferred embodiment of the invention. A data link system of FIG. 5 is adapted to transmit optical signals in a serial manner with the help of parallel-serial converting elements and to transmit electric signals in a parallel manner with the help of serial-parallel convertering elements. A controller includes a data latch circuit and a multiplexer in addition to other devices. The data latch circuit is used to record an initial data or a data immediately before the initial data, enabling the data to be corrected if any error in the data is found by a parity check or the like. The controller also includes an address counter by which desired modules can be addressed.

Data signal and address signal each consist of six bits. Therefore, $2^6$ input modules and $2^6$ or more output modules may be connected to stations. A total of 8 modules may be connected to each station. Each station is provided with two registers for making a temporary record of addresses and data, respectively. The data input module includes 6 input terminals each consisting of a pair of terminal means. Data is input by a binary digit according to whether there is a short or open circuit between the two terminal means. Also, the data output module includes 6 output terminals each consisting of a pair of terminal means which make or break a circuit according to the latched data in the data output module, so as to or not to output the data. The data input and output modules each are provided with 6-bit dip switches for setting an address for the module.

In the data link system of FIG. 5, each station is adapted to receive the emit light (optical pulse trains) with a time interval of two milliseconds. If there are only a small number of modules connected to the stations, the time of data transmission may be shortened by having a smaller range of circulation of operation of the address counter. For example, if input modules are connected by less than 5 units, the counter may be circulated through the addresses 0 to 3 (2 bits). If they number less than 9, it may be circulated through the addresses 0 to 7 (3 bits). And if they number less than 17, it may be circulated through 0 to 15 (4 bits). Connection of the maximum of 64 modules requires a total of eight stations, and in case the maximum number of modules are connected, the address counter circulates through 6 bits. In this case, the maximum of 384 pieces of data can be input since each module has a total of 6 terminals. The range of circulation of operation of the address counter can be set by operating dip switches provided in the controller.

Figure 6:
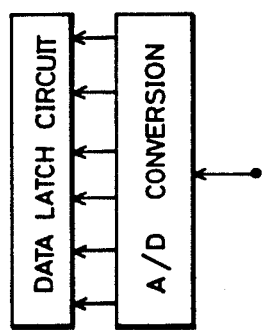
FIG. 6 shows a method for input of analog data in the data link system of FIG. 5.

Referring to FIG. 6, all or some of data input modules or one of them may be provided with a digital-to-analog converting element for receiving analog data. In this case, a voltage range of 0 to 5 volts is divided into 64 sections, and voltage in analog form is converted into a 6-bit data by the converting element, so as to put in the system such digital data.

Figure 7:
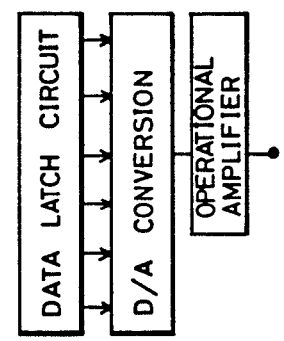
FIG. 7 shows a method for output of analog data from the data link system of FIG. 5.
Figure 8:
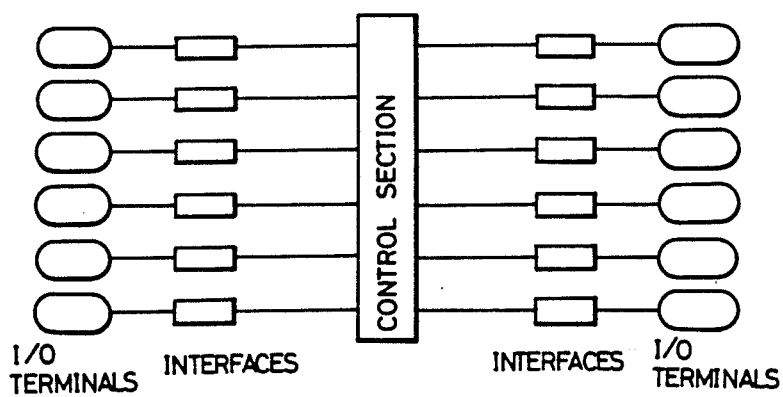
FIG. 8 shows the configuration of a conventional data link system.

Referring to FIG. 7, all or some of data output modules or one of them may be provided with an analog-to-digital converting element for output of analog data therethrough. In this case, 6-bit data are converted into a value of voltage within a range of 0 to 5 volts and are output as such by the converting element. If desired, an operational amplifier may be used in conjunction with the converting element so as to amplify the analog data to be input.

By using the present data link system, there may be easily obtained a mechanism for transmitting a number of different data or measurements, such as temperature and the like, to the corresponding number of different terminals. Also, the input and output terminals need not be modified even if the mode of operation has been changed or if the control capability of the controller has been increased; therefore, the present data link system may be easily modified as desired.

Furthermore, the present system is highly resistant to noise since it uses optical fibers.

Moreover, the present system may employ both analog and digital data modules (as data input and output modules) at the same time, providing a wide variety of applications. The number of the data transmission paths may be reduced to the minimum.

Many variations of the invention will be apparent to those skilled in the art. Accordingly, the invention is not considered to be limited to the specific embodiment described herein, but only as set forth by the appended claims.

What is claimed is:

1. An optical fiber data link system comprising a controller and at least one station connection to each other by a series of optical fibers which, as a whole, substantially makes a single loop while linking them together, said controller at least including (a) a light receiving element connected to a fiber of said loop for receiving optical signals therefrom and developing an indication responsive thereto, (b) a serial-parallel converter for converting the indication of a parallel signal, (c) a circuit for generating a signal to allow said station operative on said parallel signal to determine which of two signals, i.e., address signal or data signal, has been received thereby, (d) an address setting circuit, (e) a parallel-serial converter and (f) a luminous element for receiving signal data and providing serial optical signals to a fiber of said loop, said station at least including (i) a light receiving element, (ii) a serial-parallel converter, (iii) a circuit for determining which of two signals, i.e., address signal or data signal has been received by the station, (iv) a parallel-serial converter and (v) a luminous element, said elements (i)–(v) of a station being interconnected for receiving data from a first fiber of said loop, and for transmitting data to a next fiber of said loop, at least one data module being connected to said station, and said at least one data module having an address of its own assigned thereto in advance.

2. An optical fiber data link system in accordance with claim 1 wherein said at least one data module numbers more than one unit, including at least one data input module and at least one data output module.

3. An optical fiber data link system in accordance with claim 2 wherein said at least one data input module and said at least one data output module each are provided with n-bit dip switches for assigning an n-bit address thereto and also provided with m-bit terminals each consisting of a pair of terminal means for carrying m-bit data, both said n and said m being a positive whole number.

4. An optical fiber data link system in accordance with claim 3 wherein said at least one data input module is adapted to input m-bit data when said terminal means of m-bit terminals thereof have made contact with each other, while said at least one data output module is adapted to output m-bit data when said terminal means of m-bit terminals thereof have made contact with each other.

5. An optical fiber data link system in accordance with claim 4 wherein said at least one data input module comprises an analog data input module with a means for converting an analog data into a m-bit digital signal, said m being a positive whole number.

6. An optical fiber data link system in accordance with claim 4 wherein said at least one data output module comprises an analog data output module with a means for converting m-bit data into analog data and with a circuit for supplying voltage or current with a magnitude proportional to the value of said converted data, said m being a positive whole number.

7. An optical fiber data link system in accordance with claim 3 wherein said at least one data input module comprises an analog data input module with a means for converting an analog data into a m-bit digital signal, said m being a positive whole number.

8. An optical fiber data link system in accordance with claim 3 wherein said at least one data output module comprises an analog data output module with a means for converting m-bit data into analog data and with a circuit for supplying voltage or current with a magnitude proportional to the value of said converted data, said m being a positive whole number.

9. An optical fiber data link system in accordance with claim 2 wherein said at least one data input module is adapted to input data in the system if its address has been set by said controller, while said at least one data output module is adapted to receive said data from said at least one data input module if its address is the same as that of said at least one data input module.

10. An optical fiber data link system in accordance with claim 9 wherein said at least one data input module comprises an analog data input module with a means for converting an analog data into a m-bit digital signal, said m being a positive whole number.

11. An optical fiber data link system in accordance with claim 9 wherein said at least one data input module and said at least one data output module each are provided with n-bit dip switches for assigning an n-bit address thereto and also provided with m-bit terminals each consisting of a pair of terminal means for carrying m-bit data, both said n and m being a positive whole number.

12. An optical fiber data link system in accordance with claim 9 wherein said at least one data output module comprises an analog data output module with a means for converting m-bit data into analog data and with a circuit for supplying voltage or current with a magnitude proportional to the value of said converted data, said m being a positive whole number.

13. An optical fiber data link system link system in accordance with claim 2 wherein said at least one data input module includes an address decoder for receiving and decoding address information, a comparison circuit for comparing a decoded address to an address of said module, a switch circuit for interconnecting a station with a data latch circuit, a data latch circuit for latching data from an input terminal and at least one input terminal.

14. An optical fiber data link system in accordance with claim 2 wherein said at least one data output module includes an address decoder for receiving and decoding address information, a comparison circuit for comparing a decoded address to an address of said module, a switch circuit for interconnecting a station with a latch circuit, a data latch circuit for latching data interconnected by said switch circuit, and at least one output terminal connected thereto for receiving said latched data.

15. An optical fiber data link system in accordance with claim 2 wherein said at least one data input module comprises an analog data input module with a means for converting an analog data into a m-bit digital signal, said m being a positive whole number.

16. An optical fiber data link system in accordance with claim 2 wherein said at least one data output module comprises an analog data output module with a means for converting m-bit data into analog data and with a circuit for supplying voltage or current with a magnitude proportional to the value of said converted data, said m being a positive whole number.

17. An optical fber data link system in accordance with claim 1 wherein at least one data module is a data input module.

18. An optical fiber data link system in accordance with claim 17 wherein said at least one data input module includes an address decoder for receiving and decoding address information, a comparison circuit for comparing a decoded address to an address of said module, a switch circuit for interconnecting a station with a latch circuit, a data latch circuit for latching data from an input terminal and at least one input terminal.

19. An optical fiber data link system in accordance with claim 18 wherein said at least one data input module comprises an analog data input module with a means for converting an analog data into a m-bit digital signal, said m being a positive whole number.

20. An optical fiber data link system in accordance with claim 17 wherein said at least one data input module comprises an analog data input module with a means for converting an analog data into a m-bit digital signal, said m being a positive whole number.

21. An optical fiber data link system in accordance with claim 17 wherein said at least one data module is provided with n-bit dip switches for assigning an n-bit address thereto and also provided with m-bit terminal each consisting of a pair of terminal means for carrying m-bit data, both said n and said m being a positive whole number.

22. An optical fiber data link system in accordance with claim 1 wherein said at least one data module is a data output module.

23. An optical fiber data link system in accordance with claim 22 wherein said at least one data output module includes an address decoder for receiving and decoding address information, a comparison circuit for comparing a decoded address to an address of said module, a switch circuit for interconnecting a station with a latch circuit, a data latch circuit for latching data interconnected by said switch circuit and at least one output terminal connected thereto for receiving said latched data thereon.

24. An opticalfiber data link system in accordance with claim 23 wherein said at least one data output module comprises an analog data output module with a means for converting m-bit data into analog data and with a circuit for supplying voltage or current with a magnitude proportional to the value of said converted data, said m being a positive whole number.

25. An optical fiber data link system in accordance with claim 22 wherein said at least one data output module comprises an analog data output module with a means for converting m-bit data into analog data and with a circuit for supplying voltage or current with a magnitude proportional to the value of said converted data, said m being a positive whole number.

26. An optical fiber data link system in accordance with claim 22 wherein said at least one data module is provided with n-bit dip switches for assigning an n-bit address thereto and also provided with m-bit terminals each consisting of a pair of terminal means for carrying m-bit data, both said n and said m being a positive whole number.

27. An optical fiber data link system in accordance with claim 1, wherein said at least one data module is provided with n-bit dip switches for assigning an n-bit address thereto and also provided with m-bit terminals each consisting of a pair of terminal means for carrying m-bit data, both said n and said m being a positive whole number.

* * * * *